TROPANYLHYDRAZINES

Floyd E. Anderson, Morris Plains, and Metro Fedorchuk, East Orange, N.J., assignors to Wallace & Tiernan Inc., Belleville, N.J., a corporation of Delaware
No Drawing. Filed Mar. 12, 1962, Ser. No. 179,233
7 Claims. (Cl. 260—292)

The invention relates to tropanylhydrazines, sometimes called tropylhydrazines. More particularly the invention is concerned with novel substituted diaryltropanylhydrazines which are useful as anticholinergic agents. It is also concerned with the use of such novel diaryltropanylhydrazine compounds, and with therapeutic compositions containing them.

According to the present invention there are provided novel tropanylhydrazine compounds of the formula:

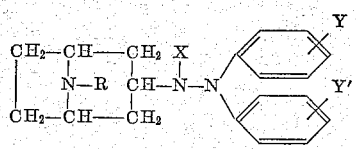

where R represents hydrogen; lower alkyl such as methyl, ethyl, propyl and butyl; hydroxyloweralkyl; and aralkyl groups such as benzyl, phenylethyl and phenylpropyl; X represents hydrogen; lower alkyl and lower aliphatic acyl such as acetyl, propionyl; and Y and Y' represent hydrogen; halogen such as chlorine, bromine and fluorine; lower alkyl; and lower alkoxy; and their combinations; and also the acid addition salts and the quaternary ammonium salts of the base compound. The formation of such acid addition salts and quaternary amomnium salts involves the nitrogen of the tropane unit.

The following specific compounds are particularly included in this invention: N,N-diphenyl-N'-3-tropanylhydrazine, N,N-diphenyl-N'-3-tropanylhydrazine oxalate, N,N-diphenyl-N'-3-tropanylhydrazine methiodide, N,N-diphenyl-N'-3-tropanylidenehydrazine oxalate( tropinone diphenylhydrazone oxalate), compounds where R is $CH_3$, X is hydrogen, and Y is hydrogen and Y' is Cl, $OCH_3$, and $CH_3$, a compound where R is $CH_2CH_2OH$, and X, Y and Y' are all hydrogen, and a compound where R is $CH_3$, Y and Y' both hydrogen, and X is $COCH_3$.

Acid addition salts and quaternary ammonium salts of the tropanylhydrazines are included within this invention. By reacting the hydrazine derivative with a mineral or organic acid an addition salt is produced. Acids such as hydrochloric, sulfuric, formic, acetic, citric, oxalic, maleic, fumaric, phosphoric, sulphonic cation exchange resins, carboxylic acid cation exchange resins, and phosphonic cation exchange resins may be used to form salts.

Quaternary ammonium salts are readily produced by combining the hydrazine with a suitable alkylating agent such as an alkyl or aralkyl ester of an acid and particularly dimethyl sulfate, methyl chloride, ethyl bromide, methyl iodide, phenylethyl chloride, benzyl chloride, O-chlorobenzyl bromide and equivalents thereof.

The following examples are presented to illustrate, but not to limit, the invention.

EXAMPLE 1

N,N-Diphenyl-N'-3-Tropanylidenehydrazine Oxalate

A solution of 1.00 g. (0.0072 mole) of tropinone, 1.32 g. (0.0072 mole) of 1,1-diphenylhydrazine and 10 drops of glacial acetic acid in 10 cc. of absolute ethanol was refluxed for 5 hours and then allowed to stand overnight. The ethanol was removed by evaporaton on a steam bath, the oily residue taken up in ether and filtered. The ethereal solution was evaporated to dryness, the residue taken up in absolute ethanol and the solution treated with an excess of an ethanolic solution of oxalic acid. The oxalic acid addition salt was precipitated by the addition of ether yielding a gummy product that solidified on rubbing; yield 0.8 g. (28%). After three recrystallizations from absolute ethanol the light yellow crystals melted at 170° C. (dec.).

Analysis:

|  | C | H | N |
|---|---|---|---|
| Calculated for $C_{20}H_{23}N_3 \cdot C_2H_2O_4$ | 66.82 | 6.37 | 10.63 |
| Found | 66.32 | 6.21 | 10.77, 10.46 |

Reaction between 1,1-diphenylhydrazine and tropinone was also effected by heating at 100° C. under reduced pressure in the absence of solvent and acid catalyst. The same compound was also obtained when 1,1-diphenylhydrazine hydrochloride was reacted with tropinone in ethanol in the presence of sodium acetate. When the reaciton between the hydrazine and tropinone was carried out in ethanol in the presence of glacial acetic acid the yields were improved by simultaneously removing the water formed. This was conveniently effected by using a Soxhlet extractor charged with calcium oxide.

EXAMPLE 2

N,N-Diphenyl-N'-3-Tropanylhydrazine Oxalate

An aqueous solution of 2.16 g. (0.0055 mole) of N,N-diphenyl-N'-3-tropanylidenehydrazine oxalate was made strongly basic with 25% aqueous sodium hydroxide. The oily base was extracted with several portions of ether and the combined ethereal extracts dried with anhydrous magnesium sulfate. The dried ethereal solution of N,N-diphenyl-N'-3-tropanylidenehydrazine was slowly added to 0.5 g. (0.0131 mole) of lithium aluminum hydride in 50 cc. of dry ether. The mixture was stirred and refluxed under nitrogen for 24 hours and the complex decomposed by the addition of water followed by 25% aqueous sodium hydroxide. The water layer was separated and washed twice with ether. The combined ethereal phases were dried with anhydrous magnesium sulfate and the ether removed under reduced pressure. The semisolid residue was taken up in anhydrous ethanol and the resulting solution treated with an excess of an ethanolic solution of oxalic acid. The oxalate precipitated as an oil on addition of ether. After rubbing several times with fresh portions of ether a semisolid was obtained. This was dissolved in absolute ethanol and ether added until crystals begin to form; yield 0.75 g. (35%). After three recrystallizations from absolute ethanol the cream-colored crystals melted at 185–188° C. (dec.).

Analysis:

|  | C | H | N |
|---|---|---|---|
| Calculated for $C_{20}H_{25}N_3 \cdot C_2H_2O_4$ | 66.46 | 6.85 | 10.57 |
| Found | 66.72 | 6.90 | 10.43 |

EXAMPLE 3

N,N-Diphenyl-N'-3-Tropanylhydrazine

A dry ethereal solution of 3.85 g. (0.0126 mole) of N,N-diphenyl-N'-3-tropanylidenehydrazine was added slowly to 1.2 g. (0.0315 mole) of lithium aluminum hydride in 80 cc. of dry ether. The mixture was stirred and refluxed under nitrogen for 24 hours and the complex decomposed by the successive addition of 1.5 cc. of water, 1.5 cc. of 15% aqueous sodium hydroxide and 7.0 cc. of water. The solid was filtered off and washed with ether. The ethereal phases were combined and dried with anhydrous magnesium sulfate and the ether removed under reduced pressure. The waxy residue was recrystallized from n-hexane to yield 2.04 g. (53%) of product, M.P. 115–117.5° C. A sample for analysis was recrystallized three more times from n-hexane to yield colorless crystals, M.P. 119–119.5° C.

Analysis:

|  | C | H |
|---|---|---|
| Calculated for $C_{20}H_{25}N_3$ | 78.13 | 8.20 |
| Found | 78.68 | 8.19 |

EXAMPLE 4

N,N-Diphenyl-N'-3-Tropanylhydrazine Methiodide

Five grams (0.0163 mole) of N,N-diphenyl-N'-3-tropanylhydrazine was dissolved in acetone and 3.45 g. (an excess) of methyl iodide was added to the resulting solution. The white crystalline product formed almost immediately, yielding 6.7 g. (92%); M.P. 240–245° C. (dec.). The methiodide was recrystallized once from methanol, yield 5.7 g.; M.P. 243–245° C. (dec.).

Analysis:

|  | C | H | I | N |
|---|---|---|---|---|
| Calculated for $C_{21}H_{28}IN_3$ | 56.11 | 6.28 | 28.24 | 9.35 |
| Found | 55.56 | 6.55 | 28.28 | 8.98 |
|  |  |  | 28.32 | 9.18 |

EXAMPLE 5

Benzylchloride of N,N-Diphenyl-N'-3-Tropanylhydrazine

To a solution of 4.0 g. (0.013 mole) of N,N-diphenyl-N'-3-tropanylhydrazine in 50 ml. of acetone was added 2.25 ml. (50% in excess) of benzylchloride. The resulting mixture was allowed to stand for 4 days during which time crystals appeared. The mixture was then refluxed 4 hours, cooled, and the white salt filtered to yield 5.0 g., M.P. 236–238.5° C. (dec.). After two recrystallizations from absolute methanol the product melted at 160–165° C. The high melting salt dissolved readily in methanol at room temperature, but on several minutes' standing crystals begin to form. This observation, the decrease in melting point after recrystallization and the fact that the melt resolidifies and decomposes at 230° C. indicates that the compound had solvated.

Analysis:

|  | C | H | N | Cl |
|---|---|---|---|---|
| Calculated for $C_{27}H_{32}ClN_3 \cdot 2CH_3OH$ | 69.93 | 8.10 | 8.44 | 7.12 |
| Found | 69.23 | 7.78 | 8.61 | 7.24 |

EXAMPLE 6

N-p-Methoxyphenyl-N-Phenylhydrazine

To 10.7 g. (0.047 mole) of N-nitroso-p-methoxydiphenylamine in 250 ml. of dry ether at 10° C. was slowly added 2.0 g. (0.0525 mole) of lithium aluminum hydride in 50 ml. of dry ether. The reaction mixture was stirred an additional hour at 10° C. The complex was then decomposed with successive additions of 2.0 ml. of water, 2.0 ml. of 15% aqueous sodium hydroxide, and 6.0 ml. of water while maintaining the temperature at 10° C. After one hour the reaction mixture was filtered, and the ethereal solution dried over anhydrous magnesium sulfate. The ether was then removed under reduced pressure to yield 10.1 g. of a crystalline residue, M.P. 70–73° C. After three recrystallizations from a mixture of n-hexane and ethanol (50:1), the cream colored flakes melted at 71–72° C.

Analysis:

|  | C | H | N |
|---|---|---|---|
| Calculated for $C_{13}H_{14}N_2O$ | 72.87 | 6.59 | 13.08 |
| Found | 73.75 | 6.77 | 13.10 |

The product reduced Fehlings solution on heating, and gave an immediate violet color in concentrated sulfuric acid.

EXAMPLE 7

N-p-Methoxyphenyl-N-Phenyl-N'-3-Tropanylidenehydrazine

A mixture of 7.5 g. (0.054 mole) of tropinone, 11.5 g. (0.054 mole) of N-p-methoxyphenyl-N-phenylhydrazine, one ml. of glacial acetic acid and 125 ml. of absolute ethanol was refluxed for 6½ hours. Water produced by the reaction was removed by causing the refluxing solvent to return through a Sohlet extractor filled with calcium oxide. Forty percent aqueous sodium hydroxide (1.75 ml.) was added to the reaction mixture and the resulting solution evaporated to dryness under reduced pressure. The residue was taken up in ether and filtered; the ethereal filtrate was washed with water until the water washings tested near neutral; it was then dried over anhydrous magnesium sulfate. The drying agent was removed and the ethereal solution concentrated and chilled in the refrigerator. The tan-colored crystalline hydrazone which separated weighed 12.0 g., M.P. 66–71° C. The crude hydrazone was dissolved in hot isopropyl ether and the solution treated with four successive portions of charcoal. The resulting solution yielded colorless crystals. After three additional recrystallizations from isopropyl ether, the product melted at 66–72° C.

Analysis:

|  | C | H | N |
|---|---|---|---|
| Calculated for $C_{21}H_{25}N_3O$ | 75.19 | 7.51 | 12.53 |
| Found | 74.45 | 7.77 | 12.65 |

EXAMPLE 8

N-p-Methoxyphenyl-N-Phenyl-N'-3-Tropanylhydrazine

A suspension of 3.76 g. (0.011 mole) of crude N-p-methoxyphenyl-N-phenyl-N'-3-tropanylidenehydrazine in 50 ml. of dry ether was added to 1.3 g. (0.033 mole) of lithium aluminum hydride in 100 ml. of dry ether. The mixture was refluxed with stirring for 24 hours. The lithium aluminum hydride complex was then decomposed by the successive addition of 1.3 ml. of water, 1.3 ml. of 15% aqueous sodium hydroxide, and 3.9 ml. of water. The mixture was filtered and the ethereal solution dried over anhydrous magnesium sulfate. The ether was then removed yielding an oil which crystallized on standing. This was triturated with isopropyl ether and filtered to obtain 2.5 g. of a colorless solid. After four recrystallizations from isopropyl ether, the colorless needles melted at 132.5–133.5° C.

Analysis:

|  | C | H | N |
|---|---|---|---|
| Calculated for $C_{21}H_{27}N_3O$ | 74.74 | 8.07 | 12.45 |
| Found | 75.03 | 8.11 | 12.15 |

EXAMPLE 9

N-p-Chlorophenyl-N-Phenylhydrazine Oxalate

To 5.7 g. (0.0245 mole) of N-nitroso-p-chlorodiphenylamine in 75 ml. of dry ether at 10° C. was slowly added 1.05 g. (0.0275 mole) of lithium aluminum hydride in 25 ml. of dry ether. The reaction mixture was stirred an additional hour at 10° C. The complex was then decomposed with successive addition of 1.1 ml. of water, 1.1 ml. of 15% aqueous sodium hydroxide, and 3.3 ml. of water while maintaining the temperature at 10° C. After two hours the reaction mixture was filtered, the ethereal solution dried over anhydrous magnesium sulfate and then treated with an excess of an ethereal solution of anhydrous oxalic acid. Yield of the crude oxalate was 6.7 g. (89%). A portion of the crude material was recrystallized once from absolute ethanol to yield a white powdery oxalate, M.P. 148–9° C. (dec.).

The above oxalate proved to be identical with that prepared from the hydrazine synthesized by the method of M. M. Jamison and E. E. Turner, Journal of the Chemical Society (London), p. 1954 (1937).

Analysis:

|  | N | Cl |
|---|---|---|
| Calculated for $C_{19}H_{11}ClN_2 \cdot C_2H_2O_4$ | 9.08 | 11.48 |
| Found | 9.13 | 11.08 |

EXAMPLE 10

N-p-Chlorophenyl-N-Phenyl-N'-3-Tropanylhydrazine

A mixture of 8.2 g. (0.059 mole) of tropinone, 12.9 g. (0.059 mole) of N-p-chlorophenyl-N-phenylhydrazine, one ml. of glacial acetic acid, and 125 ml. of absolute ethanol was refluxed for 7 hours. Water produced by the reaction was removed by causing the refluxing solvent to return through a Soxhlet extractor filled with calcium oxide. After the addition of 1.75 ml. of 40% aqueous sodium hydroxide, the ethanol was removed under reduced pressure. The residue was taken up in ether, filtered, and the ethereal solution washed with water until the washings tested near neutral. The ethereal solution was then dried over anhydrous magnesium sulfate. Addition of an ethereal solution of anhydrous oxalic acid yielded a gummy oxalate which solidified on trituration. This oxalate, tropinone N-p-chlorophenyl-N-phenylhydrazone oxalate, did not give a blue color when dissolved in concentrated sulfuric acid, a reaction characteristic of diarylhydrazines. The crude oxalate was dissolved in water, the solution made strongly basic with sodium hydroxide, and the free base taken up in ether and dried over anhydrous magnesium sulfate.

The dried ethereal solution of the hydrazone was added to 6.7 g. (0.177 mole) of lithium aluminum hydride in 400 ml. of dry ether. The mixture was refluxed with stirring for 23 hours. The complex was then decomposed by the successive additions of 6.7 ml. of water, 6.7 ml. of 15% aqueous sodium hydroxide, and 20.1 ml. of water. The mixture was filtered and the ethereal solution dried over anhydrous magnesium sulfate. The ether was then removed under reduced pressure yielding a brown oil. This viscous oil was redissolved in ether and the ether again evaporated on a water bath. As the solution became more concentrated the product crystallized. The crystalline mass was triturated with isopropyl ether and filtered to yield 6.0 g. of a white solid, M.P. 112–117° C. After three recrystallization from isopropyl ether, the colorless needles melted at 117–118° C. This compound gave a blue color when dissolved in concentrated sulfuric acid.

Analysis:

|  | C | H | N |
|---|---|---|---|
| Calculated for $C_{20}H_{24}ClN_3$ | 70.26 | 7.07 | 12.28 |
| Found | 70.31 | 7.26 | 12.13 |

The compounds of this invention are useful as anticholinergic or antispasmodic agents. They are not only different chemically from the monophenyltropanyl hydrazines of Biel, U.S. Patent 2,927,111, but there are also basic differences in the pharmacological activities. These differences have been demonstrated, as shown in the accompanying Table A wherein I represents the N,N-diphenyl-N'-3-tropanylhydrazine of this invention and II represents the N-monophenyl-N'-3-tropanylhydrazine compound of the Biel U.S. Patent 2,927,111.

TABLE A

| Compound | Spontaneous Gut Motility | | Antispasmodic Activity | Anti-Tremorine Activity |
|---|---|---|---|---|
| | Dog | Rat | | |
| I | Markedly Inhibited. | Markedly Inhibited. | 2–10×Atropine potency. | Marked. |
| II | Little affected; Less than 1/40 of I. | Not affected. | 1/300 of Atropine potency. | None. |

The results shown in the above table can be better understood by the following explanation:

*Spontaneous gut motility.*—Antispasmodic agents characteristically inhibit intestinal motility as indicated (a) by reduction in the length of time required for passage of a test (charcoal) meal in the rat; and, (b) by reduction in the magnitude and/or frequency of intestinal contractions in the dog. As shown in the table the diphenyl derivative (I) markedly inhibited this effect in the rat and dog. Biel's compound, however, was almost completely devoid of such activity. To demonstrate such activity 40 times as much of the Biel compound was required.

*Antispasmodic activity.*—Antispasmodic compounds characteristically inhibit spasms of the intestine that are induced by chemical agents such as acetylchloline. In one such test of antispasmodic activity utilizing the isolated intestine of the guinea pig, the diphenyl derivative (I) exhibited such activity at extremely low concentrations—actually at concentrations ranging from ½ to 1/10 that required for atropine sulfate which is customarily employed as a standard of reference in such tests. The Biel compound was essentially devoid of such activity, since 300 times the dose of atropine was required for an effect.

*Anti-tremorine activity.*—Certain antispasmodic agents, e.g., benztropine methanesulfonate (Cogentin), ethopropazine (Parsidol) atropine, etc., inhibit the tremor-producing effects of the agent "Tremorine" which is 1,4-dipyrrolidino-2-butyne. There is evidence that such activity in animals is correlated with the compound's therapeutic effectiveness in hyperkinetic states, such as parkinsonism (paralysis agitans), chorea, etc. The diphenyl derivative (I) exhibited anti-Tremorine activity in the potency range of Cogentin, which is customarily employed as a standard of reference. The $ED_{50}$ of I was actually 6.9 (4.2–11.4) mg./kg., p.o., or approximately 1/22 of the lethal dose, indicating a wide margin of safety. This $ED_{50}$ is the oral dose which is effective in fifty percent of the animals (calculated according to the method of J. T. Litchfield, Jr., and F. W. Wilcoxon, Journal of Pharmacology and Experimental Therapeutics, vol. 96, page 99 (1949)). The Biel compound, however, was completely devoid of such activity.

The compounds of this invention are useful by themselves as anticholinergic agents, but generally are mixed with pharmaceutically acceptable carriers, which may be present in wide limits such as 1% to 95% of the total composition.

The following formulations are suitable generally for use in dogs, cats and other mammals, and dosage amounts for humans are included. The amount of drug compound as drug base in a unit dose for a human can suitably range from approximately .1 mg. to 10.0 mg. These formulations may utilize any of the compounds of the general formula, and most particularly with N,N-diphenyl-N'-3-tropanylhydrazine and its non-toxic salts. This compound appears to have an activity in the range of 2 to 10 times that of atropine. In addition to the anticholinergic activity and anti-tremorine activity of these compounds the quaternary ammonium derivatives exhibit considerable gastric anti-secretory action in the amounts indicated. For purposes of brevity in these formulae the compound N,N-diphenyl-N'-3-tropanylhydrazine is referred to as the "Drug."

(1) *Formula for 1 Liter of Eye Drop Preparation*

| | Range |
|---|---|
| Drug, as soluble hydrochloride, citrate, acetate or phosphate salt_____g__ | 2 to 10 |
| Benzalkonium chloride_____mg__ | 20 to 40 |
| $NaH_2PO_4$ _____g__ | 4.5 |
| $Na_2HPO_4$ _____g__ | 4.75 |
| NaCl _____approx. g__ | [1] 4.5 |
| Sterile distilled water to make 1 liter. | |

[1] Slight variations in the amount of NaCl are made contingent on the level required to produce an isotonic solution. An isotonic solution is considered to be a solution having a freezing point of $-0.52°$ C.

A solution of the above components is prepared according to the art, subjected to sterile filtration and packaged aseptically into appropriate sterile containers.

(2) *Ophthalmic Ointment, 1 Kilo*

| | Range |
|---|---|
| Drug, as soluble hydrochloride, citrate, acetate or phosphate_____g__ | 2 to 10 |
| Water for injection (sufficient to dissolve Drug)_____ml__ | 10 to 50 |
| Anhydrous lanolin_____g__ | 100 |
| Yellow petrolatum to make 1 kilo. | |

The ointment is prepared according to the art, being certain that all of the Drug has dissolved in the water for injection before admixing with the ointment components. This is necessary to insure elimination of any particulate matter. The product is then sterilized and packaged aseptically into sterile tubes. An appropriate preservative such as 1:25,000 benzalkonium chloride can be added.

(3) *Injectable Form, 1 Liter*

| | Range |
|---|---|
| Drug, as soluble hydrochloride, citrate, acetate or phosphate salt_____mg__ | 100 to 10,000 |
| Methylparaben _____g__ | 1 |
| Water for injection to make 1 liter. | |

A solution is prepared according to the art, subjected to sterile filtration, and then packaged aseptically into sterile ampules. A 1 ml. quantity would contain from 0.1 to 10 mg. of Drug.

(4) *Topical Ointment*

| | Range |
|---|---|
| Drug, as soluble hydrochloride, citrate, acetate or phosphate salt_____g__ | 2 to 10 |
| Distilled water (sufficient to dissolve Drug)_____ml__ | 10 to 50 |
| Anhydrous lanolin_____g__ | 100 |
| White wax_____g__ | 50 |
| Petrolatum to make 1 kilo. | |

The Drug is dissolved in sufficient water to effect solution. The anhydrous lanolin, white wax and petrolatum are melted and blended until uniform. The drug solution is introduced into the melt at a temperature not in excess of 40° C. The mixture is then stirred until congealed and packaged in appropriate tubes or jars.

(5) *Oral Forms*

(a) Capsules—1 kilo mix divided into 5,000 capsules:

| | Range, g. |
|---|---|
| Drug, as soluble hydrochloride, citrate, acetate or phosphate salt_____ | 1 to 50 |
| Magnesium stearate_____ | 5 |
| Excipient (lactose, dicalcium phosphate or starch) to make 1 kilo. | |

The Drug is blended with magnesium stearate and excipient until a uniform mixture results. This powder blend is then subdivided into 5,000 capsules of appropriate size. The composition per capsule would be:

| | Range, mg. |
|---|---|
| Drug _____ | 0.2 to 10 |
| Magnesium stearate_____ | 1 |
| Excipients to make 200 mg. | |

(b) Tablets—1 kilo mix divided into 4,000 tablets:

| | Range, g. |
|---|---|
| Drug, as soluble hydrochloride, citrate, acetate or phosphate salt_____ | 0.8 to 40 |
| Lactose _____ | 700 |
| Starch _____ | 200 |

Prepare a uniform mix and then granulate with a starch paste prepared by mixing 1 pound of starch in sufficient boiling distilled water to make 1 gallon.

Dry granules, reduce to appropriate mesh size (10 to 20 mesh) and add:

| | |
|---|---|
| Magnesium stearate_____g__ | 10 |
| Starch to make 1 kilo. | |

Mix until uniform and then compress on appropriate tablet machine. Each tablet should weigh 250 mg. The composition per tablet would be:

| | Range, g. |
|---|---|
| Drug _____ | 0.2 to 10 |
| Lactose _____ | 175 |
| Magnesium stearate_____ | 2.5 |
| Starch to make 250 mg. | |

(c) Syrup—1 liter:

| | Range |
|---|---|
| Drug, as soluble hydrochloride, citrate, acetate or phosphate salt_____mg__ | 40 to 2000 |
| Sucrose _____g__ | 500 |
| Corn syrup_____g__ | 100 |
| Methylparaben _____g__ | 1.5 |
| Propylparaben _____g__ | 0.5 |
| Flavor and color (as required). | |
| Distilled water to make 1 liter. | |

The methyl and propylparabens are dissolved in hot distilled water. Corn syrup and sugar are then added. Drug, color and flavor are added at room temperature and the final volume is adjusted to 1 liter. Each 5 ml. teaspoonful of this mixture contains:

| | |
|---|---|
| Drug _____mg__ | 0.2 to 10 |
| Vehicle to make_____ml__ | 5 |

(d) Elixir—1 liter:

| | Range |
|---|---|
| Drug as soluble hydrochloride, citrate, acetate or phosphate salt_____mg__ | 40 to 2000 |
| Glycerin _____g__ | 50 |
| Sucrose _____g__ | 300 |
| Alcohol _____ml__ | 200 |
| Methylparaben _____g__ | 1.5 |
| Flavor and color (as required). | |
| Distilled water to make 1 liter. | |

The methylparaben is dissolved in the alcohol. The Drug is dissolved in distilled water. Other components are added at room temperature and stirred until completely in solution. Final volume is adjusted to 1 liter with distilled water. Each 5 ml. teaspoonful of this mixture contains:

| | Range |
|---|---|
| Drug _____mg__ | 0.2 to 10 |
| Vehicle to make_____ml__ | 5 |

(e) Suspension—1 liter:

| | | Range |
|---|---|---|
| Drug, as base or insoluble salt such as oxalate, palmitate or mandelate | mg | 40 to 2000 |
| Methylparaben | gr | 1.5 |
| Propylparaben | g | 0.5 |
| Methyl cellulose, 400 cps | g | 20 |
| Sodium Sucaryl | g | 10 |
| Glycerin | g | 50 |
| Flavor and color (as required). | | |
| Distilled water to make 1 liter. | | |

The methyl cellulose is first mixed with the glycerin to facilitate wetting. About half the distilled water is added and allowed to stand overnight. Methyl and propylparaben are dissolved in hot distilled water, blended with the wetted methyl cellulose and mixed well. Drug, sodium Sucaryl, flavor and color are added with mixing and the final volume adjusted to 1 liter with distilled water. The entire product is then passed through a colloid mill at minimal setting, or through a homogenizer to insure permanent dispersion of the insoluble Drug. Each 5 ml. teaspoonful of this product contains:

| | | Range |
|---|---|---|
| Drug | mg | 0.2 to 10 |
| Suspension vehicle to make | ml | 5 |

Various changes and modifications of the invention can be made, and to the extent that such variations incorporate the spirit of this invention, they are intended to be included within the scope of the appended claims.

We claim:

1. A therapeutic compound of the class consisting of a free base, its addition salts with non-toxic acids, lower alkyl quaternary ammonium salts and phenyl-lower-alkyl quaternary ammonium salts, said free base having the formula:

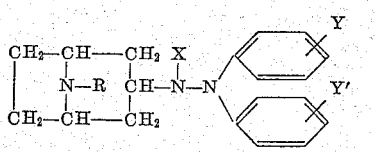

where R represents a member of the group consisting of hydrogen, lower alkyl, hydroxy lower alkyl, and phenyl substituted lower alkyl; X represents a member of the group consisting of hydrogen, lower alkyl, lower alkanoyl and Y and Y′ represent a member of the group consisting of hydrogen, halogen, lower alkyl, and lower alkoxy.

2. N,N-diphenyl-N′-3-tropanylhydrazine.

3. The non-toxic acid addition salt of the compound of claim 2.

4. The oxalic acid addition salt of the compound of claim 2.

5. N,N-diphenyl-N′-3-tropanylhydrazine methiodide.

6. N,N-diphenyl-N′-3-tropanylidenehydrazine.

7. The oxalic acid addition salt of the compound of claim 6.

References Cited in the file of this patent

UNITED STATES PATENTS

| 2,838,914 | Bernstein et al. | June 17, 1958 |
| 2,921,938 | Wetterau | Jan. 19, 1960 |
| 2,927,111 | Biel | Mar. 1, 1960 |
| 2,948,730 | Rudner | Aug. 9, 1960 |
| 3,027,302 | Carissimi | Mar. 27, 1962 |
| 3,028,306 | Poos | Apr. 3, 1962 |

FOREIGN PATENTS

| 1,007,332 | Germany | May 2, 1957 |